Patented Sept. 8, 1953

2,651,649

UNITED STATES PATENT OFFICE 2,651,649

REACTION PRODUCT OF A XANTHATE, AN INORGANIC SULFIDE, AND A COPPER SALT

Sidney B. Tuwiner, Baldwin, N. Y., assignor to Phelps Dodge Corporation, New York, N. Y., a corporation of New York No Drawing. Application September 26, 1950, Serial No. 186,913

8 Claims. (Cl. 260—438)

This invention relates to an organic composition of a metal, such as copper, that is soluble in oil and various organic solvents, and to the preparation of such a composition.

Various compounds of copper have been prepared heretofore which are organic in nature and relatively soluble in oils and various solvents, but which are relatively insoluble in water. Compounds of this nature have various useful applications; e. g., such copper compounds as copper resinates and naphthenates are commonly used as fungicides or preservatives for impregnating wood, cloth, and in various agricultural sprays. A compound of the oil soluble type applied to a surface exposed to the weather is usually more effective because of its greater resistance to the washing and leaching action of the rain. This is true whether the product is applied to the leaves of plants for the control of fungus infections, or whether the product is applied to wood, such as piling that is driven into wet ground or exposed to the weather above ground.

Such oil soluble organic compounds of copper, however, either have been soluble only to a limited extent, or have contained very little copper in proportion to their total weight. Thus, it has been only in rare instances, heretofore, that such a copper compound could be made to form a solution containing as much as 10% of copper, the active fungicidal constituent.

It is an object of this invention to provide a composition that consists essentially of a compound or mixture of compounds of copper, that contains as much as 50% or more of the metal and that can be dissolved to form solutions in hydrocarbon oils containing as much as 40% of copper.

It is a further object of this invention to provide a process of preparing such compositions by a relatively simple reaction and by the use of relatively inexpensive and easily prepared solutions.

The products of my invention are prepared by reacting in solution, preferably aqueous solution, a xanthate and a sulfide with a salt or compound of copper. As a practical matter it is best to use cuprous salts. The higher valence or oxidized forms of the compounds could be used, but if cupric compounds are employed, they would first be reduced by the action of the sulfide and xanthate so that the final reaction in any case would take place between the sulfide-xanthate mixture and the cuprous compound. It is much better, therefore, as a practical matter to start with the lower valence type of compound.

It is not known whether the reaction product thus obtained is a single compound or a mixture of different individual compounds. At any event, the reaction product is a complex sulfide-xanthate composition that differs from previously known organic metal compounds of this type in its solubility in oils, alcohols and hydrocarbon solvents. The product is amorphous in nature and forms an oil solution of an intense and deep red color. Such a solution of the copper product when spread upon a surface so that the solvent is evaporated, forms a brittle, resinous film which has a semi-metallic lustre.

The compositions of my invention are preferably made by using a mixture of xanthate and sulfide in approximately the ratio of 3 mols of sulfide for each 2 mols of xanthate. From 2 to 4 mols of sulfide can be used for each 2 mols of xanthate with good results although the best solubility is obtained with the 3 to 2 ratio. For best results, the amount of copper compound employed should be approximately equivalent to the combined amount of the xanthate and sulfide. In the case of cuprous compounds I consider each atom of copper as equivalent to one mol of xanthate, or to one-half mol of sulfide.

I have also found that in order to obtain the best products it is highly desirable to use a xanthate that is purified in some manner before the reaction with the copper compound takes place. If an impure or commercial type of xanthate product is used, the efficiency of the reaction is very low and even less than half of the copper in the product may be soluble.

The following specific example is given to illustrate my invention although it is to be understood that the reaction can be carried out in any kind of a solution, and by a reaction in which the components are combined in one batch at a time or continuously.

*Example I.*—A purified water soluble xanthate was first prepared from a saturated solution in water of a commercial potassium methyl isobutyl carbinol xanthate. Sodium chloride crystals were added to this saturated xanthate solution over a period of two hours with agitation at room temperature until the solution had been saturated with the sodium chloride. A slurry was thus formed which contained the crystallized xanthate salt that had separated from the solution, leaving the impurities in the solution. These xanthate crystals were then separated by centrifuging and washed with a saturated solution of sodium chloride. This filter cake was then re-dissolved in water to form a saturated solution and again precipitated with salt as before. The twice purified xanthate crystals were separated by centrifuging and washed.

Since the xanthate and sulfide do not react with each other, these ingredients were first combined in an aqueous solution. The purified xanthate salt obtained as described above was dissolved in water together with sodium sulfide to form a solution which was 0.375 molar with respect to the potassium methyl isobutyl carbinol xanthate and 0.5625 molar with respect to sodium sulfide. This solution was caused to flow into the side arm of a T connection with water flowing through the main part of the T. The water was flowed through at the rate of 10 liters per minute. The sulfide and xanthate solution was flowed into this stream at the rate of 158.6 cc./min. and a short distance downstream from the T a solution of sodium cuprous chloride was flowed into the stream at the rate of 212.4 cc./min. This latter solution contained 71.16 gms./L of copper, 209.8 gms./L of chloride, and 40.49 gms./L of sulphate. The reaction product suspended in the stream of water was discharged into a tank of suitable capacity where the precipitate was allowed to settle and then separated by filtration. The precipitate was washed with water, air dried, and then dissolved in an appropriate solvent, such as xylol. It was found that by following this procedure about 96% of the copper in the product was soluble.

Various sulfides such as ammonium sulfide, potassium sulfide, or even a neutralized solution of $H_2S$ may be employed instead of sodium sulfide. Other xanthates may of course be used although with the lower homologous xanthates there is a much greater tendency for the compound to polymerize, and solutions of the lower xanthates may become unstable even at room temperatures. I found that in general the primary and normal xanthates are preferable to the secondary and isoxanthates.

The salting out procedure is satisfactory for purifying any of the more complex xanthates that are not as soluble in water as sodium chloride. Other xanthates will have to be purified by other procedures and techniques as will be understood by those skilled in the art.

Compositions prepared as described herein may be used directly in the form of solutions in oils or suitable hydrocarbon solvents, or the oil solutions may be applied with the aid of a dispersant such as freon.

The terms and expressions which I have employed are used as terms of description and not of limitation, and I have no intention, in the use of such terms and expressions, of excluding any equivalents of the features shown and described or portions thereof, but recognize that various modifications are possible within the scope of the invention claimed.

I claim:

1. An oil soluble organic composition which comprises the reaction product in aqueous solution of a mixture of a water soluble xanthate and a water soluble inorganic sulfide with an equivalent amount of a water soluble salt of copper.

2. An oil soluble organic composition which comprises the reaction product in aqueous solution of a mixture of a xanthate and an inorganic sulfide in the approximate proportions of 2 mols of xanthate to 2 to 4 mols of sulfide with approximately an equivalent amount of a water soluble cuprous salt.

3. An oil soluble organic product obtained by reaction in aqueous solution of a purified xanthate and an inorganic sulfide with an equivalent amount of water soluble cuprous salt.

4. An organic copper composition that is soluble or miscible with oils and hydrocarbon solvents which comprises the reaction product in aqueous solution of a purified high molecular weight xanthate and an inorganic sulfide with approximately an equivalent amount of water soluble cuprous salt.

5. An organic copper composition that is soluble or miscible with oils and hydrocarbon solvents which comprises the reaction product in aqueous solution of approximately 3 mols of an inorganic sulfide and 2 mols of a purified xanthate with approximately an equivalent amount of a water soluble cuprous salt.

6. A method of preparing an oil soluble organic copper composition which comprises reacting in aqueous solution a mixture of an inorganic sulfide and a xanthate, with a water soluble copper salt.

7. A method of preparing an oil soluble organic copper composition which comprises reacting in aqueous solution an inorganic sulfide and a xanthate in the proportions of about 2 to 4 mols of sulfide to 2 mols of xanthate, with approximately an equivalent amount of a water soluble cuprous salt, and separating the water insoluble precipitate thus formed.

8. A method of preparing an oil soluble organic copper composition which comprises reacting in aqueous solution approximately 3 mols of inorganic sulfide and 2 mols of a purified xanthate with approximately an equivalent amount of a water soluble cuprous salt, and separating the precipitate thus formed.

SIDNEY B. TUWINER.

No references cited.